United States Patent
He et al.

(10) Patent No.: US 12,309,831 B2
(45) Date of Patent: May 20, 2025

(54) DIFFERENTIATED RANDOM ACCESS IN NEW RADIO

(71) Applicant: QUALCOMM Incorporated, San Diego, CA (US)

(72) Inventors: Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 16/009,302

(22) Filed: Jun. 15, 2018

(65) Prior Publication Data

US 2018/0368179 A1 Dec. 20, 2018

Related U.S. Application Data

(60) Provisional application No. 62/623,547, filed on Jan. 29, 2018, provisional application No. 62/616,415, filed on Jan. 11, 2018, provisional application No. 62/521,273, filed on Jun. 16, 2017.

(51) Int. Cl.
H04W 74/00 (2009.01)
H04W 74/0833 (2024.01)

(52) U.S. Cl.
CPC ...... *H04W 74/002* (2013.01); *H04W 74/0833* (2013.01)

(58) Field of Classification Search
CPC ................ H04W 74/008; H04W 74/0833
See application file for complete search history.

(56) References Cited

U.S. PATENT DOCUMENTS

| 9,730,245 | B2 | 8/2017 | Li et al. |
| 10,009,926 | B2* | 6/2018 | Vajapeyam ............ H04W 4/70 |
| 10,349,449 | B2* | 7/2019 | Hong .................. H04W 72/042 |
| 10,588,154 | B2* | 3/2020 | Pelletier ........... H04W 74/0891 |
| 10,805,960 | B2* | 10/2020 | Yi ..................... H04W 72/0446 |

(Continued)

FOREIGN PATENT DOCUMENTS

| CN | 102440057 A | 5/2012 |
| CN | 102917375 A | 2/2013 |

(Continued)

OTHER PUBLICATIONS

Jheng et al., "Handling of Reflective Mapping in Mobile Communication Systems", May 5, 2017, specification for U.S. Appl. No. 62/501,917. (Year: 2017).*

(Continued)

*Primary Examiner* — Guang W Li
(74) *Attorney, Agent, or Firm* — Paul M. McAdams; Shumaker & Sieffert, PA

(57) ABSTRACT

Certain aspects of the present disclosure generally relate to wireless communications and more specifically to differentiating physical random access channel (PRACH) procedures. An exemplary method performed by a user equipment generally includes detecting a trigger to perform a physical random access channel (PRACH) procedure, selecting, from a plurality of sets of PRACH parameters, a set of PRACH parameters to use in the PRACH procedure, based on the trigger, and performing the PRACH procedure using the selected set of PRACH parameters.

15 Claims, 12 Drawing Sheets

(56) References Cited

U.S. PATENT DOCUMENTS

| | | | |
|---|---|---|---|
| 10,893,480 B2* | 1/2021 | Kusashima | H04W 88/06 |
| 10,897,780 B2* | 1/2021 | Islam | H04W 74/0833 |
| 10,985,825 B2* | 4/2021 | Xiong | H04B 7/088 |
| 10,993,270 B2* | 4/2021 | Agiwal | H04W 74/085 |
| 11,229,081 B2* | 1/2022 | Ahn | H04W 72/046 |
| 11,259,331 B2* | 2/2022 | Jeon | H04W 74/006 |
| 11,395,362 B2* | 7/2022 | Yang | H04W 74/0833 |
| 11,432,340 B2* | 8/2022 | Agiwal | H04W 74/0833 |
| 2010/0210255 A1 | 8/2010 | Amirijoo et al. | |
| 2012/0039171 A1 | 2/2012 | Yamada et al. | |
| 2012/0077507 A1 | 3/2012 | Lee | |
| 2012/0082192 A1 | 4/2012 | Pelletier et al. | |
| 2012/0281530 A1 | 11/2012 | Sambhwani et al. | |
| 2013/0242730 A1* | 9/2013 | Pelletier | H04W 74/0833 370/230 |
| 2014/0112254 A1* | 4/2014 | Lindoff | H04W 74/002 370/328 |
| 2015/0016312 A1 | 1/2015 | Li et al. | |
| 2015/0049697 A1* | 2/2015 | Worrall | H04W 72/0413 370/329 |
| 2015/0124594 A1 | 5/2015 | Ryu et al. | |
| 2015/0181461 A1* | 6/2015 | Kim | H04W 74/08 370/236 |
| 2016/0021681 A1* | 1/2016 | Nan | H04W 74/0866 370/329 |
| 2017/0135135 A1* | 5/2017 | Pelletier | H04L 1/0072 |
| 2017/0231011 A1* | 8/2017 | Park | H04W 74/006 |
| 2017/0280481 A1* | 9/2017 | Stern-Berkowitz | H04W 74/004 |
| 2017/0280484 A1* | 9/2017 | Awad | H04W 74/0833 |
| 2017/0367120 A1* | 12/2017 | Murray | H04W 74/0833 |
| 2018/0270895 A1* | 9/2018 | Park | H04W 68/00 |
| 2018/0324631 A1* | 11/2018 | Jheng | H04L 1/1887 |
| 2018/0324865 A1* | 11/2018 | Hui | H04W 74/004 |
| 2018/0368179 A1* | 12/2018 | He | H04W 74/008 |
| 2019/0037423 A1* | 1/2019 | Yu | H04B 7/06 |
| 2019/0044659 A1* | 2/2019 | Aln | H04W 16/26 |
| 2019/0075598 A1* | 3/2019 | Li | H04W 74/0833 |
| 2019/0082335 A1* | 3/2019 | Yu | H04W 74/0833 |
| 2019/0200248 A1* | 6/2019 | Basu Mallick | H04W 24/04 |
| 2019/0215761 A1 | 7/2019 | Hirata et al. | |
| 2019/0254064 A1* | 8/2019 | Islam | H04W 74/004 |
| 2019/0274169 A1* | 9/2019 | Tsai | H04W 56/0045 |
| 2020/0022038 A1* | 1/2020 | Han | H04W 74/0833 |
| 2020/0275524 A1* | 8/2020 | Wang | H04B 7/0695 |
| 2020/0336249 A1* | 10/2020 | Yi | H04W 72/23 |
| 2021/0037590 A1* | 2/2021 | Yang | H04W 76/18 |
| 2021/0144770 A1* | 5/2021 | Tang | H04W 72/0446 |
| 2022/0061098 A1* | 2/2022 | Choi | H04L 5/14 |

FOREIGN PATENT DOCUMENTS

| | | |
|---|---|---|
| CN | 105340326 A | 2/2016 |
| CN | 105409136 A | 3/2016 |
| CN | 105578542 A | 5/2016 |
| CN | 106533517 A | 3/2017 |
| EP | 3091674 A1 | 11/2016 |
| JP | 2016532391 A | 10/2016 |
| KR | 20160030252 A | 3/2016 |
| WO | 2012064775 | 5/2012 |
| WO | 2013113197 A1 | 8/2013 |
| WO | 2015030483 A1 | 3/2015 |
| WO | WO-2016007257 | 1/2016 |
| WO | 2016047106 A1 | 3/2016 |
| WO | 2016057197 A1 | 4/2016 |
| WO | 2018061167 A1 | 4/2018 |

OTHER PUBLICATIONS

International Search Report and Written Opinion—PCT/US2018/037959—ISA/EPO—dated Oct. 5, 2018.

Taiwan Search Report—TW107120955—TIPO—dated Aug. 15, 2021.

European Search Report—EP21185571—Search Authority—The Hague—dated Sep. 24, 2021.

Intel Corporation: "NR Random Access Enhancements [online]", 3GPP TSG RAN WG2 #98, R2-1704782, Internet: URL: http://www.3gpp.org/ftp/tsg_ran/WG2_RL2/TSGR2_98/Docs/R2-1704782.zip, May 6, 2017 (newly cited), 4 Pages.

Interdigital Inc., "PRACH Resources for NR[online]", 3GPP TSG RAN WG2 #98, R2-1704909, Internet: URL: http://www.3gpp.org/ftp/tsg_ran/WG2_RL2/TSGR2_98/Docs/R2-1704909.zip, May 6, 2017 (newly cited), 3 Pages.

3GPP TS 36.300, "3rd Generation Partnership Project, Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", V 10.3.0, 197 Pages, Mar. 2011.

Ericsson, et al., "Physical Layer Parameters to be Configured by RRC (L1 Input to RRC)", 3GPP TSG RAN WG2 Meeting #61, R2-081381, (Network Slides or QFI or DRB ) and (PRACH S Parameter), Feb. 11, 2008-Feb. 15, 2008, 80 Pages.

Xu X., "Research on Key Technology of Network Optimization for 5G Mobile Communication System", National Key Laboratory of Science and Technology on Communications, Apr. 14, 2017, 88 Pages.

"3rd Generation Partnership Project; Technical Specification Group Radio Access Network; NR; NR and NG-RAN Overall Description; Stage 2 (Release 15)", 3GPP Standard; Technical Specification; 3GPP TS 38.300, 3rd Generation Partnership Project (3GPP), Mobile Competence Centre ; 650, Route Des Lucioles; F-06921 Sophia-Antipolis Cedex; France, vol. RAN WG2, No. V15.1.0, Apr. 2, 2018 (Apr. 2, 2018), pp. 1-71.

LG Electronics Inc: "Correction on BFR RA Procedure", 3GPP TSG-RAN WG2 Meeting #101bis, R2-1808637, Sanya, China, Apr. 16-20, 2018, 7 Pages.

Qualcomm Incorporated: "Backoff Indication in Multi-beam Operation", 3GPP TSG-RAN WG2 Meeting #102, R2-1808571 , Busan, Korea, May 21-25, May 2018, May 11, 2018, pp. 1-8.

Taiwan Search Report—TW107120955—TIPO—Apr. 26, 2024.

Intel Corporation: "Remapping of QFI Between DRB and Precedence Handling", 3GPP TSG-RAN WG2 Meeting #98, R2-1704801, Hangzhou, China, May 15, 2017-May 19, 2017, May 6, 2017, 4 Pages.

Interdigital Inc: "Remaining Issues on Beam Recovery for NR", 3GPP TSG RAN WG1 Meeting #89, R1-1708336, Hangzhou, P.R. China, May 15, 2017-May 19, 2017, May 6, 2017, 5 Pages.

* cited by examiner

PRACH resources for one configuration

PRACH resources for one configuration

DIFFERENTIATED RANDOM ACCESS IN NEW RADIO

CROSS-REFERENCE TO RELATED APPLICATIONS

The present Application for Patent claims priority to U.S. Provisional Application No. 62/521,273, filed Jun. 16, 2017, U.S. Provisional Application 62/616,415, filed Jan. 11, 2018, and U.S. Provisional Application No. 62/623,547, filed Jan. 29, 2018, all of which are assigned to the assignee hereof and hereby expressly incorporated by reference herein in their entireties.

BACKGROUND

Field of the Invention

Certain aspects of the present disclosure generally relate to wireless communications and more specifically to differentiating physical random access channel (PRACH) procedures.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes detecting a trigger to perform a physical random access channel (PRACH) procedure, selecting, from a plurality of sets of PRACH parameters, a set of values of the PRACH parameters to use in the PRACH procedure, based on the trigger, and performing the PRACH procedure using the selected set of values of the PRACH parameters.

Certain aspects of the present disclosure provide a method for wireless communications by a base station (BS). The method generally includes obtaining a plurality of sets of physical random access channel (PRACH) parameters, wherein each set corresponds to one or more triggers for a PRACH procedure, and transmitting an indication of one of the sets of values of the PRACH parameters and a corresponding trigger for the set.

Certain aspects of the present disclosure provide a method for wireless communications by a base station (BS) The method generally includes providing an indication of a higher-priority physical random access channel (PRACH) region comprising a set of transmission resources, within a system bandwidth, for transmitting higher-priority PRACH signals by a user equipment (UE), and determining a response window for a received PRACH signal, based on receiving the PRACH signal via the set of transmission resources.

Certain aspects of the present disclosure provide a method for wireless communications by a user equipment (UE). The method generally includes obtaining an indication of a random access response (RAR) window for higher-priority physical random access channel (PRACH) signals from a base station, and determining a RAR window for a PRACH signal transmitted to the BS, based on the PRACH signal being a higher-priority PRACH signal and the indication.

Certain aspects of the present disclosure provide an apparatus for wireless communications. The apparatus generally includes a processor configured to detect a trigger to perform a physical random access channel (PRACH) procedure, to select, from a plurality of sets of PRACH parameters, a set of values of the PRACH parameters to use in the PRACH procedure, based on the trigger, and to cause the apparatus to perform the PRACH procedure using the selected set of values of the PRACH parameters, and a memory coupled with the processor.

Certain aspects of the present disclosure provide an apparatus for wireless communications. The apparatus generally includes a processor configured to obtain a plurality of sets of physical random access channel (PRACH) parameters, wherein each set corresponds to one or more triggers for a PRACH procedure, and to cause the apparatus to transmit an indication of one of the sets of values of the PRACH parameters and a corresponding trigger for the set, and a memory coupled with the processor.

Certain aspects of the present disclosure provide an apparatus for wireless communications. The apparatus generally includes a processor configured to cause the apparatus to provide an indication of a higher-priority physical random access channel (PRACH) region comprising a set of transmission resources, within a system bandwidth, for transmitting higher-priority PRACH signals by a user equipment (UE), and to determine a response window for a received PRACH signal, based on the apparatus receiving the PRACH signal via the set of transmission resources, and a memory coupled with the processor.

Certain aspects of the present disclosure provide an apparatus for wireless communications. The apparatus generally includes a processor configured to obtain an indication of a random access response (RAR) window for higher-priority physical random access channel (PRACH) signals from a base station, and to determine a RAR window for a PRACH signal transmitted to the BS, based on the PRACH signal being a higher-priority PRACH signal and the indication, and a memory coupled with the processor.

Certain aspects of the present disclosure provide an apparatus for wireless communications. The apparatus generally includes means for detecting a trigger to perform a physical random access channel (PRACH) procedure, means for selecting, from a plurality of sets of PRACH parameters, a set of values of the PRACH parameters to use in the PRACH procedure, based on the trigger, and means for performing the PRACH procedure using the selected set of values of the PRACH parameters.

Certain aspects of the present disclosure provide an apparatus for wireless communications. The apparatus generally includes means for obtaining a plurality of sets of physical random access channel (PRACH) parameters, wherein each set corresponds to one or more triggers for a PRACH procedure, and means for transmitting an indication of one of the sets of values of the PRACH parameters and a corresponding trigger for the set.

Certain aspects of the present disclosure provide an apparatus for wireless communications. The apparatus generally includes means for providing an indication of a higher-priority physical random access channel (PRACH) region comprising a set of transmission resources, within a system bandwidth, for transmitting higher-priority PRACH signals by a user equipment (UE), and means for determining a response window for a received PRACH signal, based on receiving the PRACH signal via the set of transmission resources.

Certain aspects of the present disclosure provide an apparatus for wireless communications. The apparatus generally includes means for obtaining an indication of a random access response (RAR) window for higher-priority physical random access channel (PRACH) signals from a base station, and means for determining a RAR window for a PRACH signal transmitted to the BS, based on the PRACH signal being a higher-priority PRACH signal and the indication.

Certain aspects of the present disclosure provide computer-readable medium for wireless communications. The computer-readable medium comprises instructions that, when executed by a processor, cause the processor to perform operations that generally include detecting a trigger to perform a physical random access channel (PRACH) procedure, selecting, from a plurality of sets of PRACH parameters, a set of values of the PRACH parameters to use in the PRACH procedure, based on the trigger, and causing an apparatus to perform the PRACH procedure using the selected set of values of the PRACH parameters.

Certain aspects of the present disclosure provide computer-readable medium for wireless communications. The computer-readable medium comprises instructions that, when executed by a processor, cause the processor to perform operations that generally include obtaining a plurality of sets of physical random access channel (PRACH) parameters, wherein each set corresponds to one or more triggers for a PRACH procedure, and causing an apparatus to transmit an indication of one of the sets of values of the PRACH parameters and a corresponding trigger for the set.

Certain aspects of the present disclosure provide computer-readable medium for wireless communications. The computer-readable medium comprises instructions that, when executed by a processor, cause the processor to perform operations that generally include providing an indication of a higher-priority physical random access channel (PRACH) region comprising a set of transmission resources, within a system bandwidth, for transmitting higher-priority PRACH signals by a user equipment (UE), and determining a response window for a received PRACH signal, based on receiving the PRACH signal via the set of transmission resources.

Certain aspects of the present disclosure provide computer-readable medium for wireless communications. The computer-readable medium comprises instructions that, when executed by a processor, cause the processor to perform operations that generally include obtaining an indication of a random access response (RAR) window for higher-priority physical random access channel (PRACH) signals from a base station, and determining a RAR window for a PRACH signal transmitted to the BS, based on the PRACH signal being a higher-priority PRACH signal and the indication.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
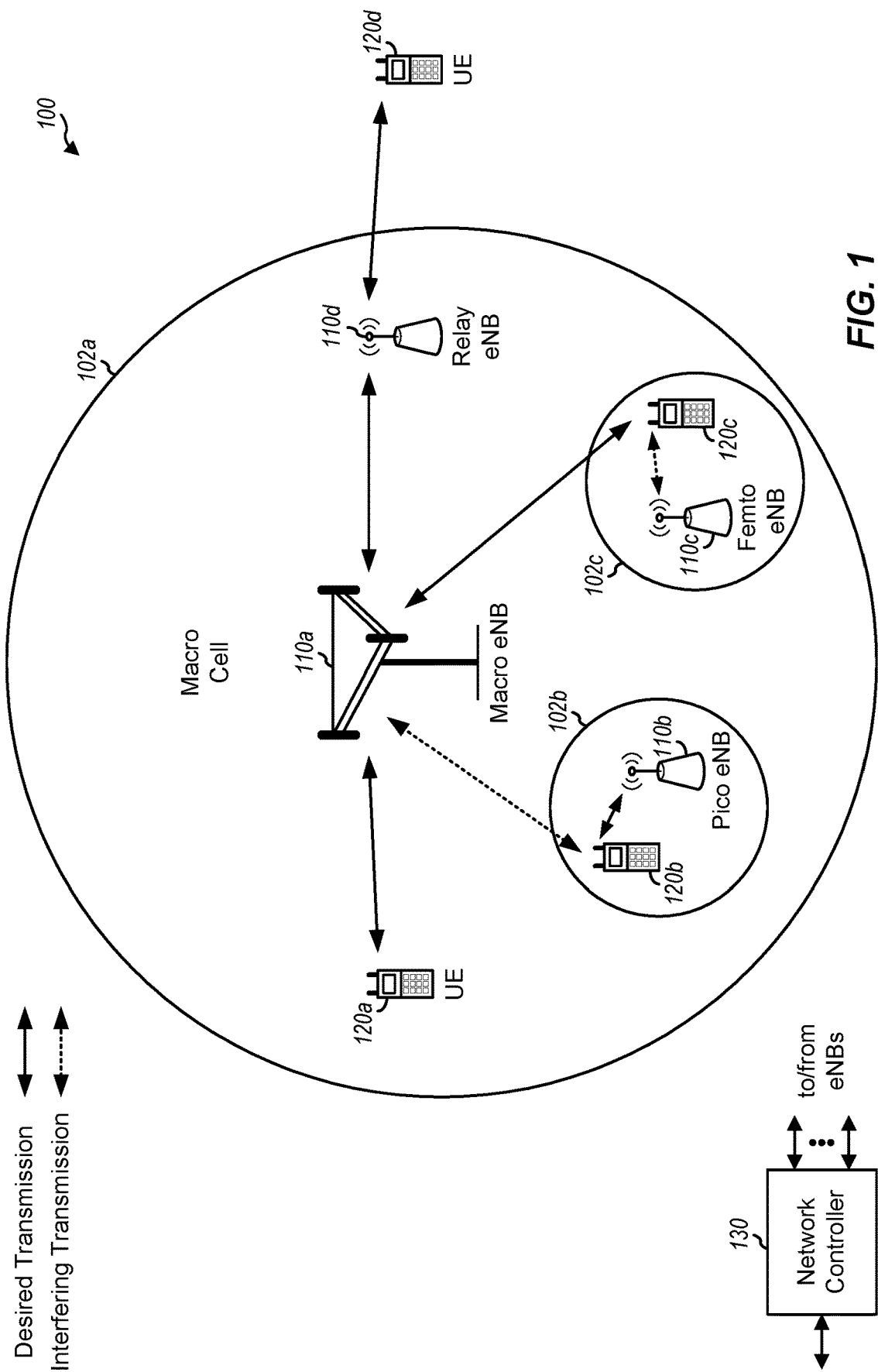
FIG. 1 is a block diagram conceptually illustrating an example wireless communication network, in accordance with certain aspects of the present disclosure.

Aspects of the present disclosure provide techniques and apparatus for differentiating physical random access channel (PRACH) procedures for user equipments (UEs) served by a network, such as cell phones, low cost (LC) machine type communication (MTC) devices, and LC enhanced MTC (eMTC) devices. According to aspects of the present disclosure, a network (e.g., a base station of the network) may configure a UE with sets of parameters for performing a physical random access channel (PRACH) procedure, enabling PRACH procedures by the UE to be differentiated from other PRACH procedures, e.g., by other UEs or by the same UE at other times. A UE may be triggered to perform a PRACH procedure (e.g., a random access procedure) and may select a set of values of parameters to use in performing the PRACH procedure based on the trigger.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation. Some next generation, NR, or 5G networks may include a number of base stations, each simultaneously supporting communication for multiple communication devices, such as UEs. In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), etc. MTC UEs include devices such as sensors, meters, monitors, location tags, drones, trackers, robots/robotic devices, etc. UEs may be implemented as internet of everything (IoE) or internet of things (IoT) (e.g., narrowband IoT (NB-IoT)) devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
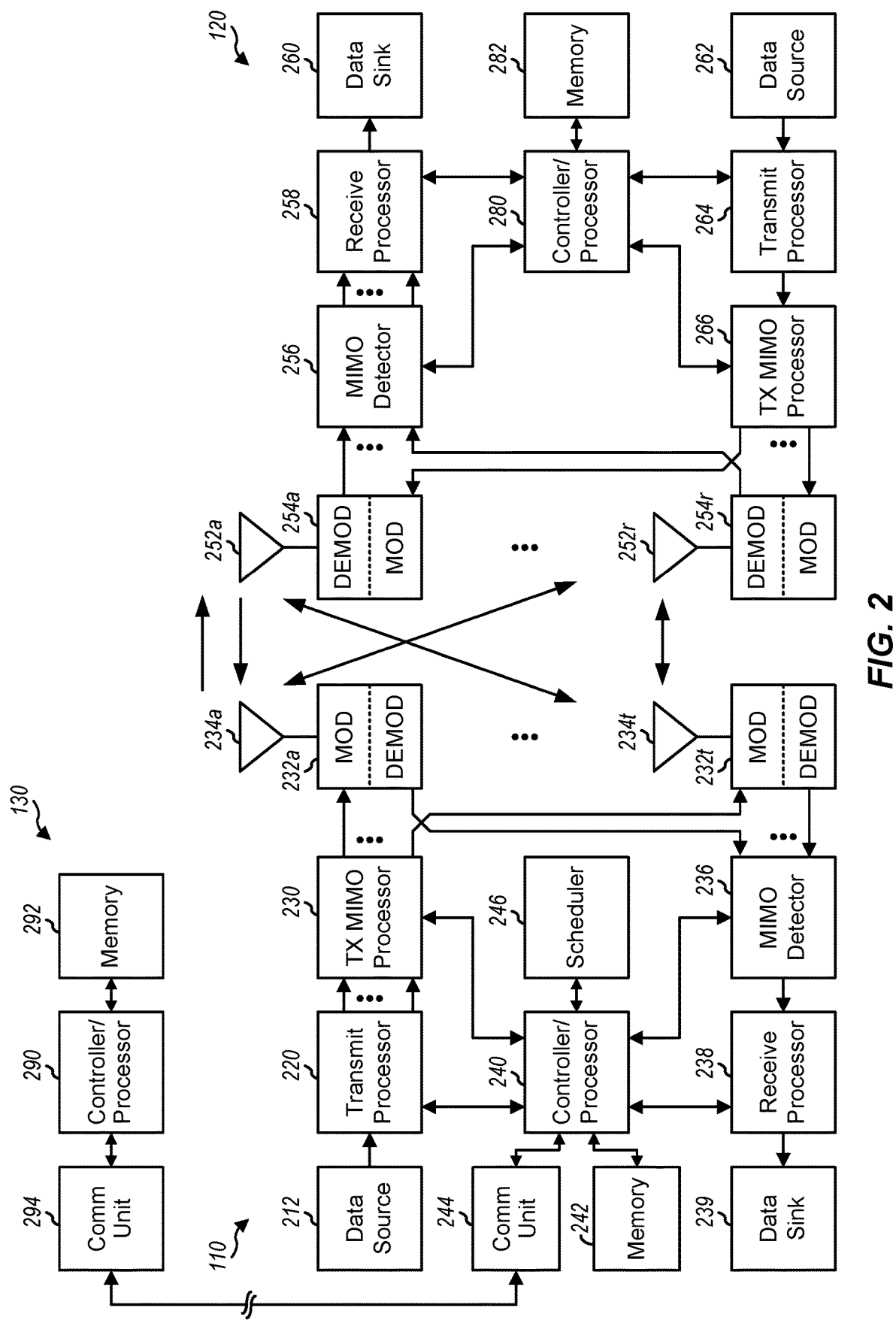
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIG. 9 and/or other processes for the techniques described herein. Similarly, controller/processor 280 and/or other processors and modules at UE 120 may perform or direct operations illustrated in FIG. 8 and/or processes for the techniques described herein. Memories 242 and 282 may store data and program codes for BS 110 and UE 120, respectively. A scheduler 246 may schedule UEs for data transmission on the downlink and/or uplink.

Figure 3:
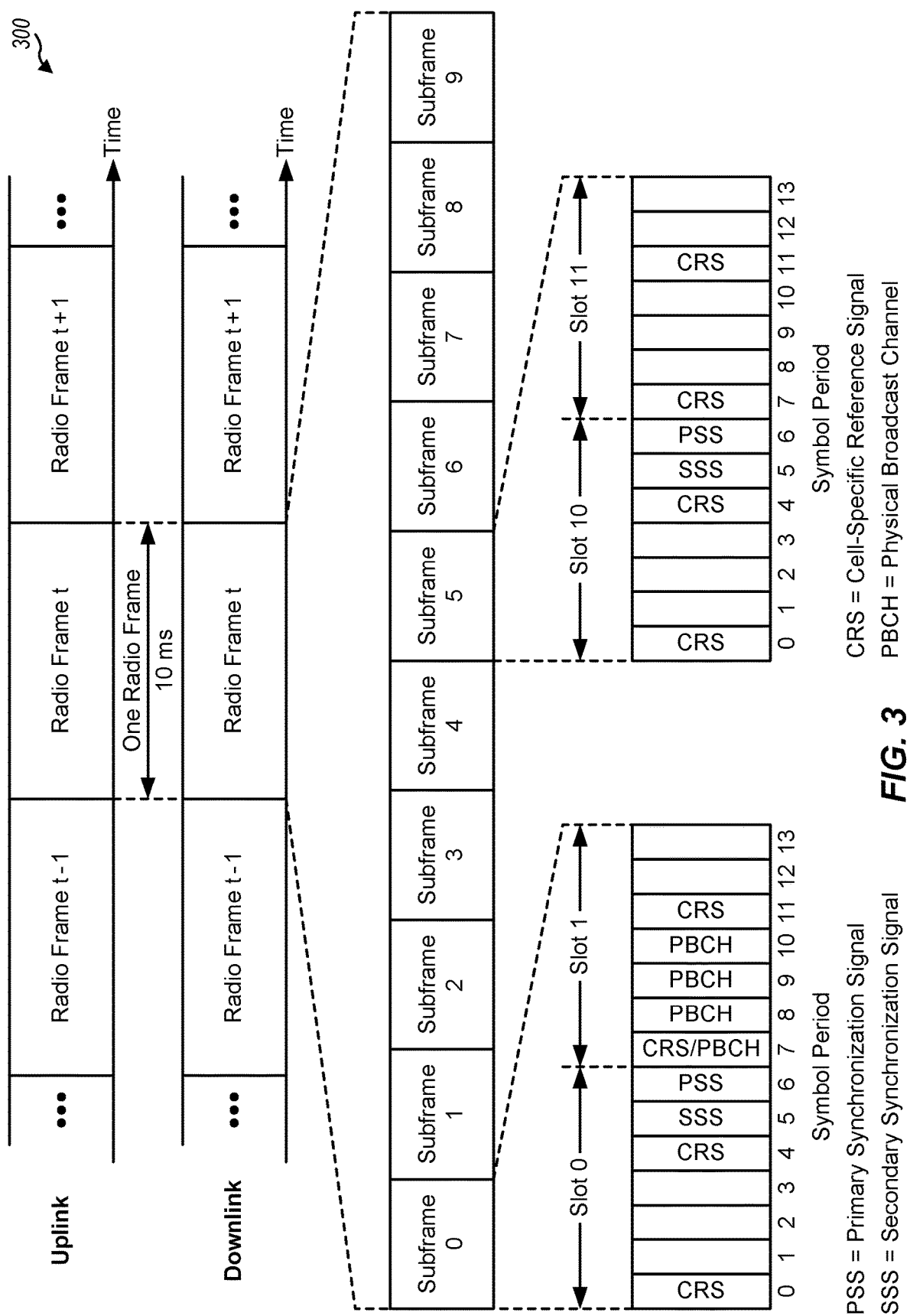
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. The eNB may transmit control information/data on an enhanced physical downlink control channel (EPDCCH) in any symbol periods of a subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
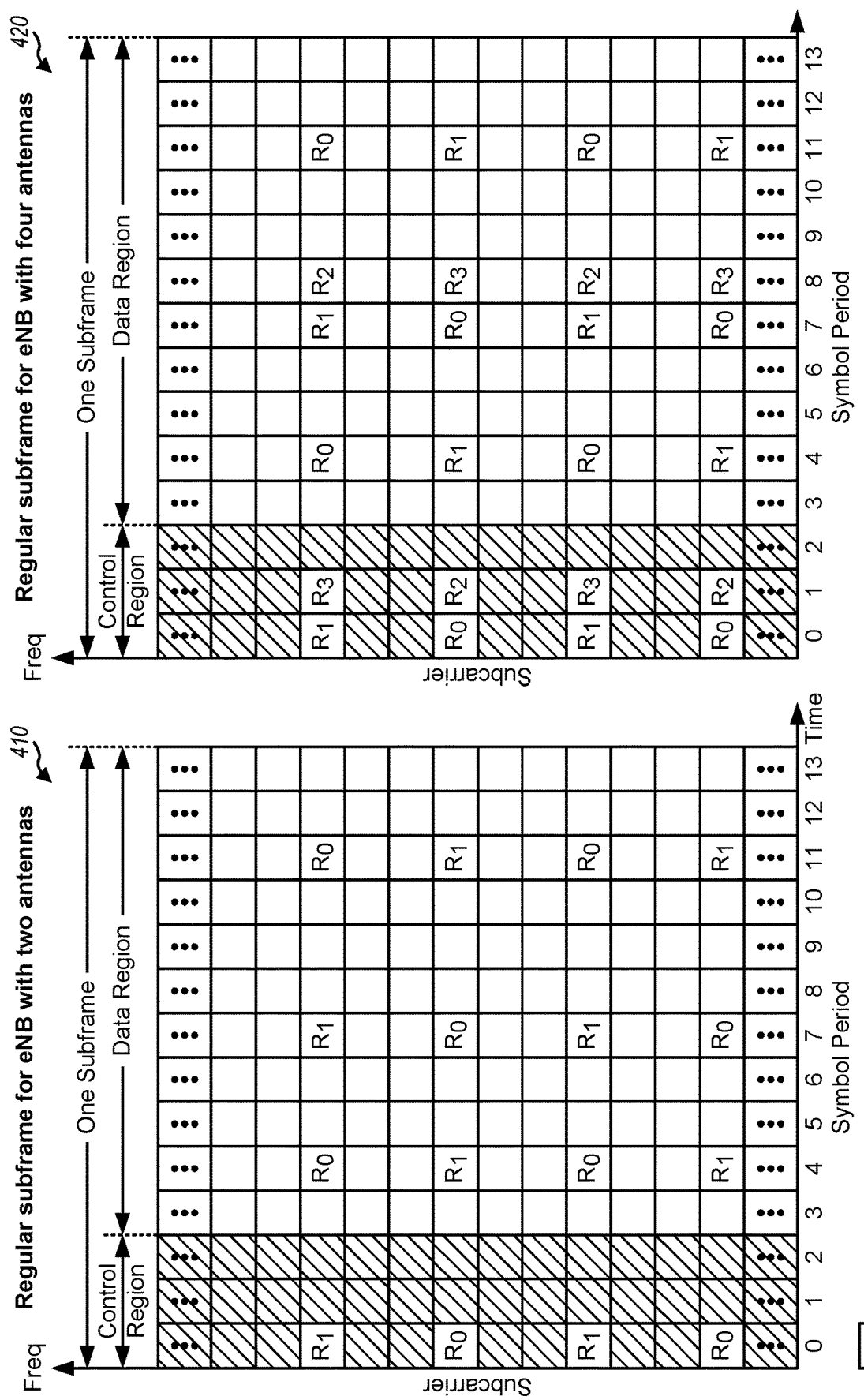
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q-1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Figure 5A:
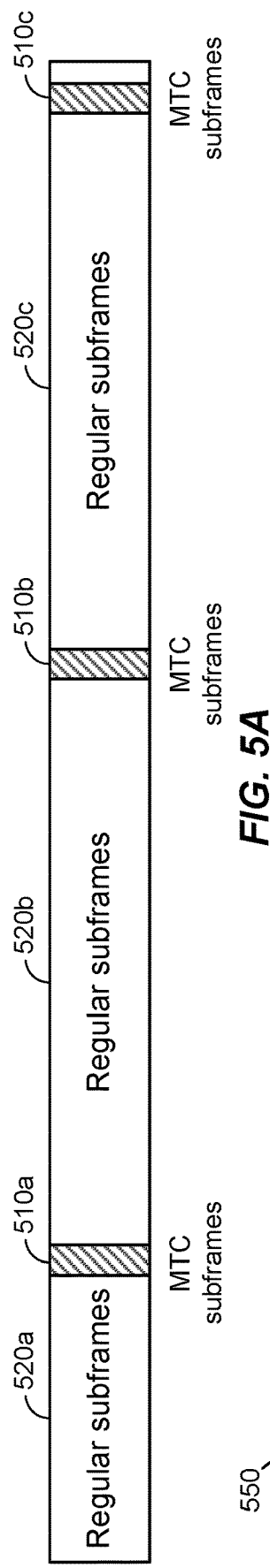
FIGS. 5A and 5B illustrate an example of MTC co-existence within a wideband system, such as LTE, in accordance with certain aspects of the present disclosure.
Figure 5B:
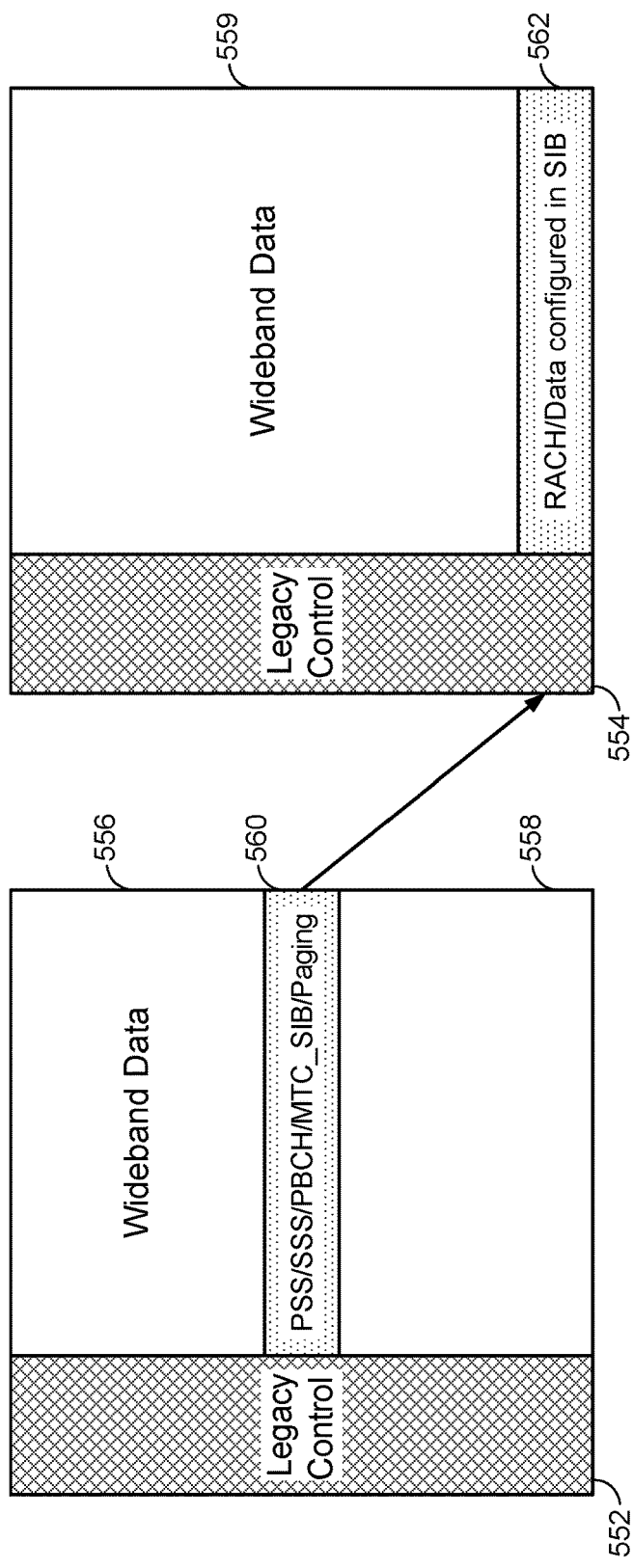

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. Regions 556 and 558 may be used by the BS for transmitting data to other UEs (e.g., non-LC UEs). As also shown in FIG. 5B, a second narrowband region 562 (e.g., also spanning no more than 6 RBs of the wideband data) of a subframe 554 may be used by a BS to transmit a RACH message or data, previously configured in signaling by the BS, to one or more of the LC UEs and/or other LC UEs. The LC UEs may have re-tuned to the second narrowband region to receive after monitoring the first narrowband region. Region 559 may be used by the BS for transmitting data to other UEs (e.g., non-LC UEs).

Although the examples described herein assume a narrowband of 6 RBs, those skilled in the art will recognize that the techniques presented herein may also be applied to different sizes of narrowband regions.

As mentioned above, in certain systems, e.g., such as LTE Rel-12, narrowband operation for MTC (e.g., eMTC) may be supported. A cell supporting narrowband operation for MTC may have different system bandwidths for downlink (DL) and uplink (UL) operations. A cell having different DL and UL system bandwidths (SBs) may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of a UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign a UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of a UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region. For example, a cell may perform DL operations in a system bandwidth of ten MHz and UL operations in a five MHz system bandwidth. In the example, the BS may determine that the minimum size of the UL system bandwidth and the DL system bandwidth is five MHz, and then determine that the BS can organize four narrowband regions in a five MHz system bandwidth. Still in the example, the BS may then organize four DL narrowband regions in the DL system bandwidth and four UL narrowband regions in the UL system bandwidth, and map each DL narrowband region to one UL narrowband region.

Figure 6:
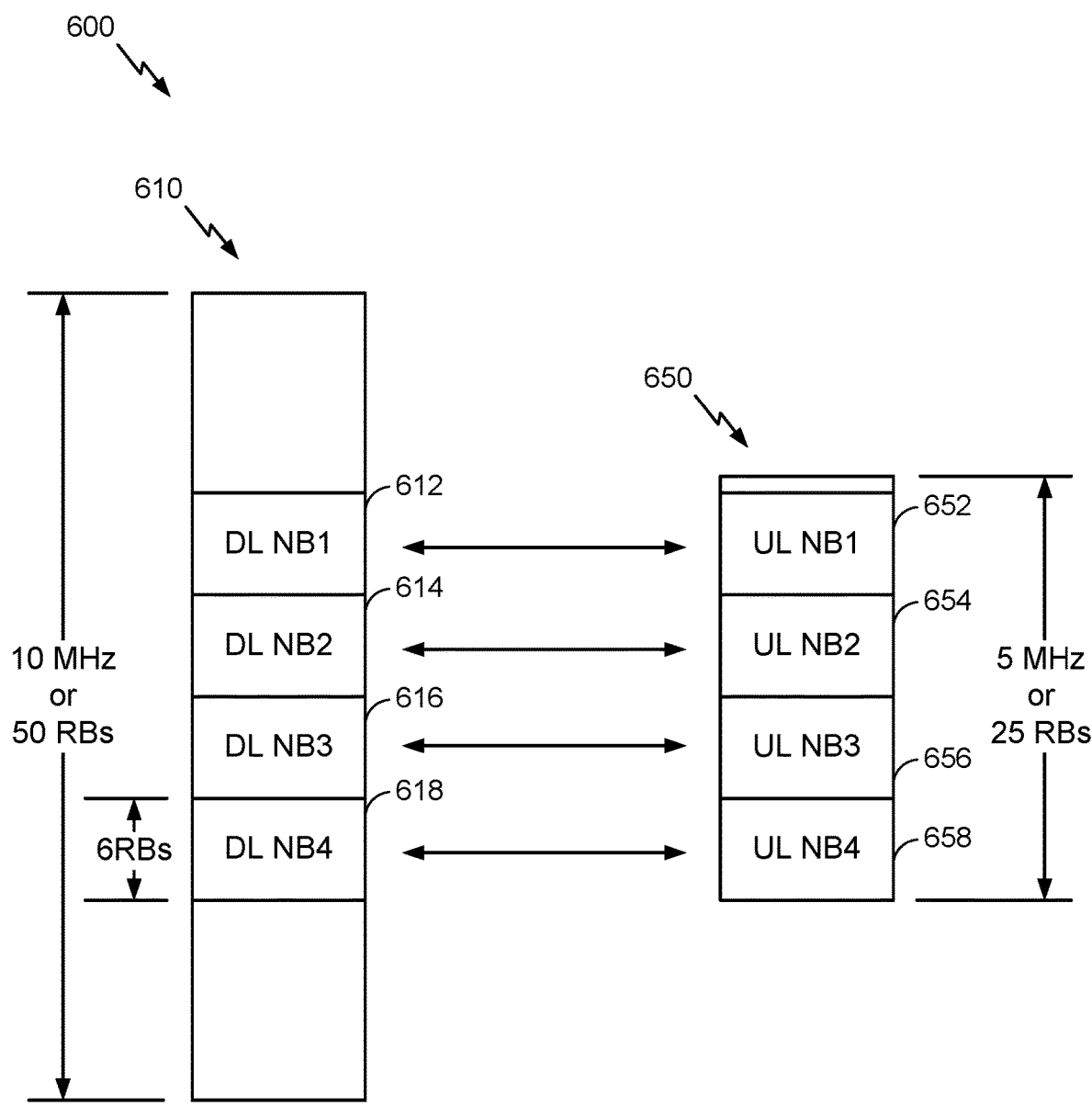
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping may be employed by eNB 110a in FIG. 1. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 may determine that the UL system bandwidth 650 is smaller than DL system bandwidth 610 (the 5 MHz size of UL system bandwidth 650 is the minimum size of the UL system bandwidth 650 and the DL system bandwidth 610). The BS may then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

Example Differentiated Random Access in New Radio

According to aspects of the present disclosure, a network (e.g., a base station of the network) may configure a UE with sets of parameters for performing a physical random access channel (PRACH) procedure, enabling PRACH procedures by the UE to be differentiated from other PRACH procedures e.g., by other UEs or by the same UE at other times. A UE may be triggered to perform a PRACH procedure (e.g., a random access procedure) and may select a set of parameters to use in performing the PRACH procedure based on the trigger.

According to aspects of the present disclosure, random access procedures in NR may be triggered for at least the following events:
(1) Initial access from RRC_IDLE;
(2) RRC Connection Re-establishment procedure;
(3) Handover;
(4) DL data arrival during RRC_CONNECTED requiring random access procedure, e.g., when UL synchronization status is "non-synchronized";
(5) UL data arrival during RRC_CONNECTED requiring random access procedure, e.g., when UL synchronization status is "non-synchronized" or there are no PUCCH resources for scheduling request (SR) available;
(6) Transition from RRC_INACTIVE to RRC_CONNECTED; and
(7) Recovering failed serving beams on a cell.

In aspects of the present disclosure, in NR the random access procedure on a secondary cell (SCell) can be supported if multiple tracking areas TAs are supported by the network, as in LTE.

According to aspects of the present disclosure, the random access procedure in NR is performed on at least a primary (PCell) upon a secondary cell group (SCG) addition and/or modification, if instructed, or upon DL and/or UL data arrival when the UE is in an RRC_CONNECTED state and needs to perform a random access procedure, e.g., if the UE is non-synchronized. The UE initiated random access procedure is only performed on PSCell for SCG, as in LTE In aspects of the present disclosure, there may be at most one random access procedure ongoing at any point in time in a medium access control (MAC) entity, for example, a MAC entity of a UE.

When a UE needs to connect with a cell to which the UE is not currently connected, the UE and the cell engage in an exchange of messages referred to as a physical random access channel (PRACH) procedure. In an example PRACH procedure, a UE transmits a physical random access channel (PRACH) signal (sometimes referred to as a preamble or message 1 (Msg1) of a PRACH procedure) in a set of transmission resources reserved for PRACH signals (sometimes referred to as a PRACH region), then the cell responds to the PRACH signal with a random access response (RAR) message (sometimes referred to as message 2 (Msg2) of a PRACH procedure) carried on the downlink shared channel (DL-SCH). The UE responds to the RAR message with an RRC connection request message (sometimes referred to as message 3 (Msg3) of a PRACH procedure), and the cell responds to the Msg3 with a contention resolution message (sometimes referred to as message 4 (Msg4) of a PRACH procedure). The UE may then be connected with the cell.

In current (e.g., LTE Rel-12) wireless technologies, a PRACH signal transmitted by an MTC device comprises a first group of 4 symbols using a first hopping pattern and a second group of 4 symbols using the first hopping pattern but offset from the first group by a random group hopping value.

Figure 7:
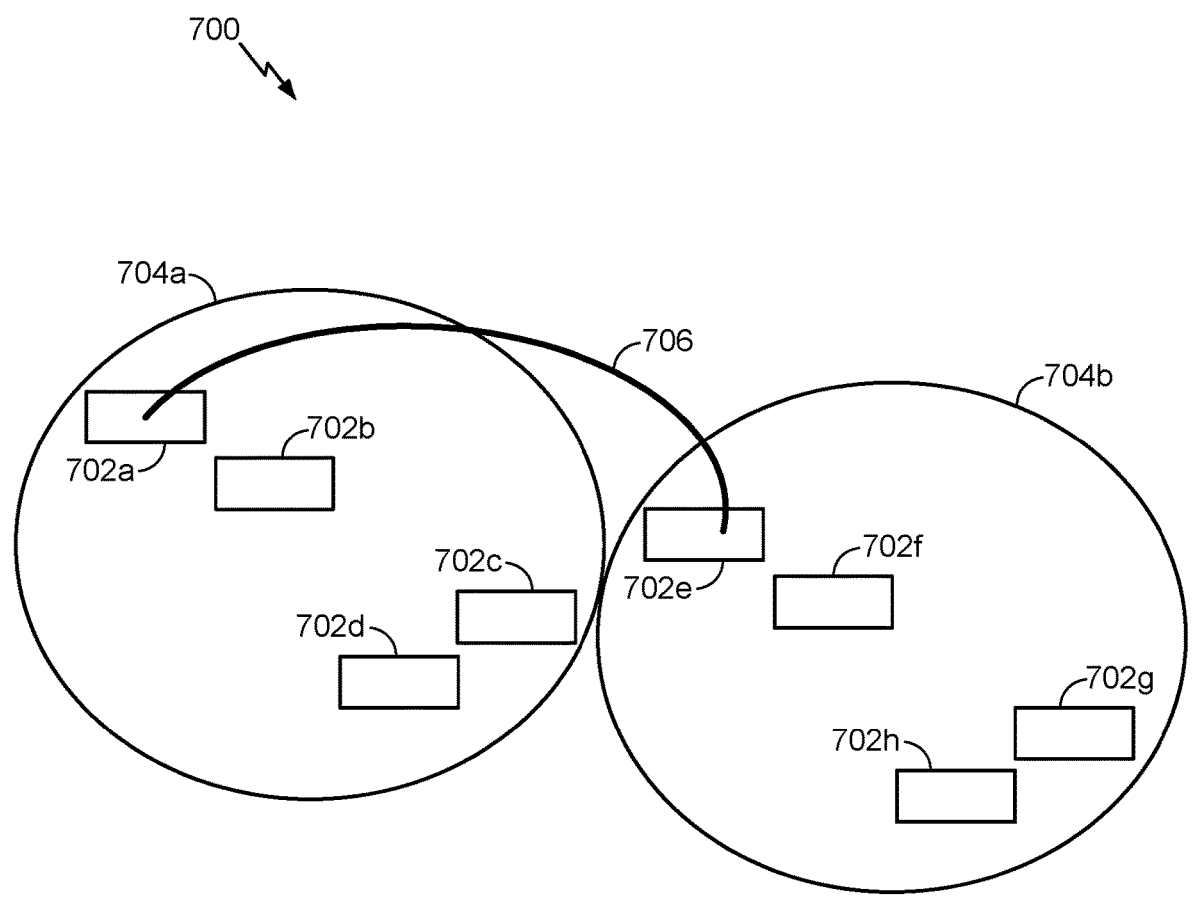
FIG. 7 schematically illustrates an exemplary physical random access channel (PRACH) signal, in accordance with certain aspects of the present disclosure.

FIG. 7 schematically illustrates an exemplary PRACH signal 700, in accordance with aspects of the present disclosure. Four symbols 702a-702d in a first group 704a are transmitted (e.g., by a UE), then a random group hopping is applied, and a second group 704b of symbols 702e-702h, with the same hopping pattern as in the first group, are transmitted (e.g., by the UE). The curve 706 illustrates the correspondence between symbol 702a in group 704a and symbol 702e in group 704b. Similarly, symbol 702b corresponds to symbol 702f, symbol 702c corresponds to symbol 702g, and symbol 702d corresponds to symbol 702h.

Tone spacing of PRACH signals (e.g., PRACH signal 700, shown in FIG. 7) may be 3.75 kHz. The symbols in a PRACH signal may use a cyclic prefix (CP) length of 66.7 microseconds (μs) or 266.7 μs, which are both different from CP lengths used for data transmission in an LTE system.

When a UE starts a random access procedure, the UE randomly selects one resource (e.g., a tone) from the resources reserved in the cell for PRACH signal transmission and transmits a PRACH signal using the resource. The UE may determine which resources in the cell are reserved for PRACH signals by receiving and decoding one or more system information blocks (SIBs) transmitted by the cell.

In the LTE baseline, all UEs perform the same random access procedure with the same set of configured parameters. No differentiation or prioritization is available. According to aspects of the present disclosure, however, there are several use cases in NR suggesting that NR should provide differentiated access.

According to aspects of the present disclosure, NR is going to support different types of services and some of the services may have different objectives for their access. For example, a network may prefer to give ultra-reliable and low-latency communications (URLLC) service faster access than other services, while eMTC service may aim to minimize the amount of energy consumed by an eMTC UE during access by the eMTC UE.

In aspects of the present disclosure, network slicing may be supported in NR. A key feature of network slicing (sometimes referred to as simply "slicing") is differentiated transport services over the same physical network. One aspect of the differentiated services may include differentiated treatment during access to a network. For example, a premium user group may require faster access and a lower blocking rate than general users.

According to aspects of the present disclosure, different types of random access events may require different access delays. For example, a UE in RCC_CONNECTED state trying to use random access to get synchronized again (e.g., after being in non-synchronized state) may be given higher priority than a UE in RRC_IDLE state trying to get initial access.

According to aspects of the present disclosure, from a procedural perspective, there is no fundamental difference in how random access procedure should be performed, even if differentiation is required. In addition, use cases that would require random access to be performed on the same numerology as the one used in connected mode have not been defined. For example, it has been agreed that quality of service (QoS) requirements for URLLC by a UE do not start until after a UE is connected. To simplify implementation, it may be desirable to have a common random access procedure for all types of services or random access events in NR. The random access procedure specified in the LTE baseline is mature and flexible, and thus using the LTE random access procedure as a baseline for NR may be a good choice.

According to aspects of the present disclosure, partitioning of PRACH resources (e.g. preambles, time/frequency) may not be a good approach to implement differentiated random access. The reason is that partitioning of PRACH resources may not be a scalable approach. The more service requirements to meet, the thinner PRACH resources are partitioned. Access contention can increase quickly if PRACH resources are partitioned into small pieces.

In aspects of the present disclosure, parameterization of the baseline PRACH procedure to support differentiation may be a more efficient and scalable approach to support differentiation than PRACH resource partitioning, without requiring any change to the design of the PRACH procedure or partitioning of PRACH resources.

Figure 8:
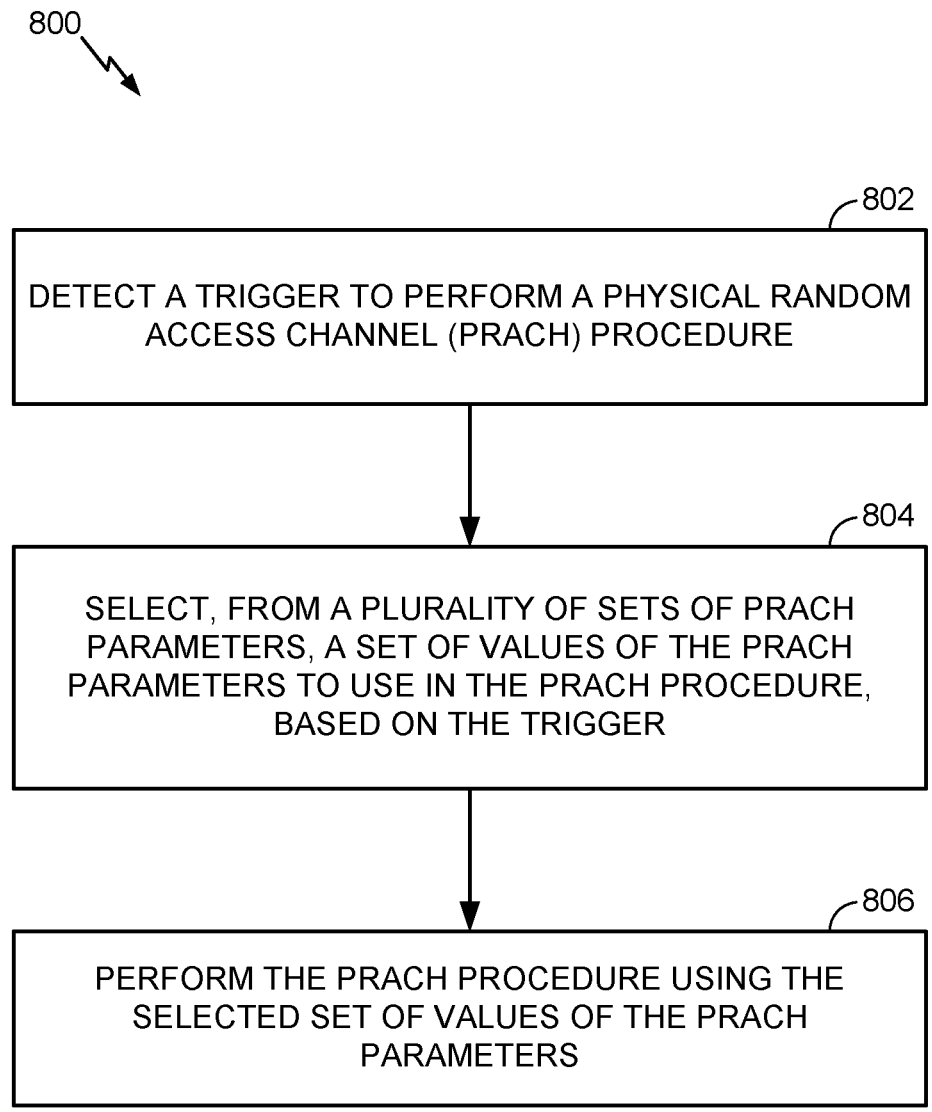
FIG. 8 illustrates exemplary operations for wireless communications that may be performed by a UE, in accordance with certain aspects of the present disclosure.

FIG. 8 illustrates example operation 800 for wireless communications that may be performed by a UE (e.g., UE 120a in FIG. 1), according to aspects of the present disclosure. The operation 800 may be performed by a UE to perform a PRACH procedure differentiated from other PRACH procedures (e.g., by other UEs or by the UE at another time).

Operation 800 begins at block 802, with the UE detecting a trigger to perform a physical random access channel (PRACH) procedure. For example, UE 120a may detect that the UE has entered an RRC disconnected state while in a cell served by BS 110a, and the UE is triggered to perform a PRACH procedure to re-establish the RRC connection.

Operation 800 continues at block 804 with the UE selecting, from a plurality of sets of PRACH parameters, a set of values of the PRACH parameters to use in the PRACH procedure, based on the trigger. Continuing the example from above, UE 120a selects, from a plurality of sets of PRACH parameters (e.g., a first set for higher-priority PRACH procedures and a second set for lower-priority PRACH procedures that the UE received in SIBs transmitted by the BS), a set of PRACH parameters (e.g., the first set for higher-priority PRACH procedures) to use in the PRACH procedure, based on the trigger to re-establish the RRC connection.

At block 806, operations 800 continue with the UE performing the PRACH procedure using the selected set of values of the PRACH parameters. Continuing the example from above, the UE performs the PRACH procedure (e.g., starting with transmitting a random access preamble as described herein) using the selected set of values (e.g., the first set for higher-priority PRACH procedures) of the PRACH parameters.

According to aspects of the present disclosure, a UE may receive one or more sets of values of PRACH parameters in a system information block (SIB) transmitted, for example, from a base station.

In aspects of the present disclosure, a UE may receive one or more sets of values of PRACH parameters via radio resource control (RRC) dedicated signaling transmitted, for example, from a base station.

According to aspects of the present disclosure, a UE may receive (e.g., from a base station) an indication that at least one of a data radio bearer (DRB), a quality of service flow indicator (QFI), or a network slice is associated with the set of values of the PRACH parameters. The network may establish the association of set(s) of values of PRACH parameters with one or more DRBs, QFIs, or network slices.

In aspects of the present disclosure, a UE may receive (e.g., from a base station) an indication that the set of values (e.g., the set of values selected in block 804) of the PRACH parameters is associated with a set of data radio bearers (DRBs), quality of service flow indicators (QFIs), or network slices.

Figure 9:
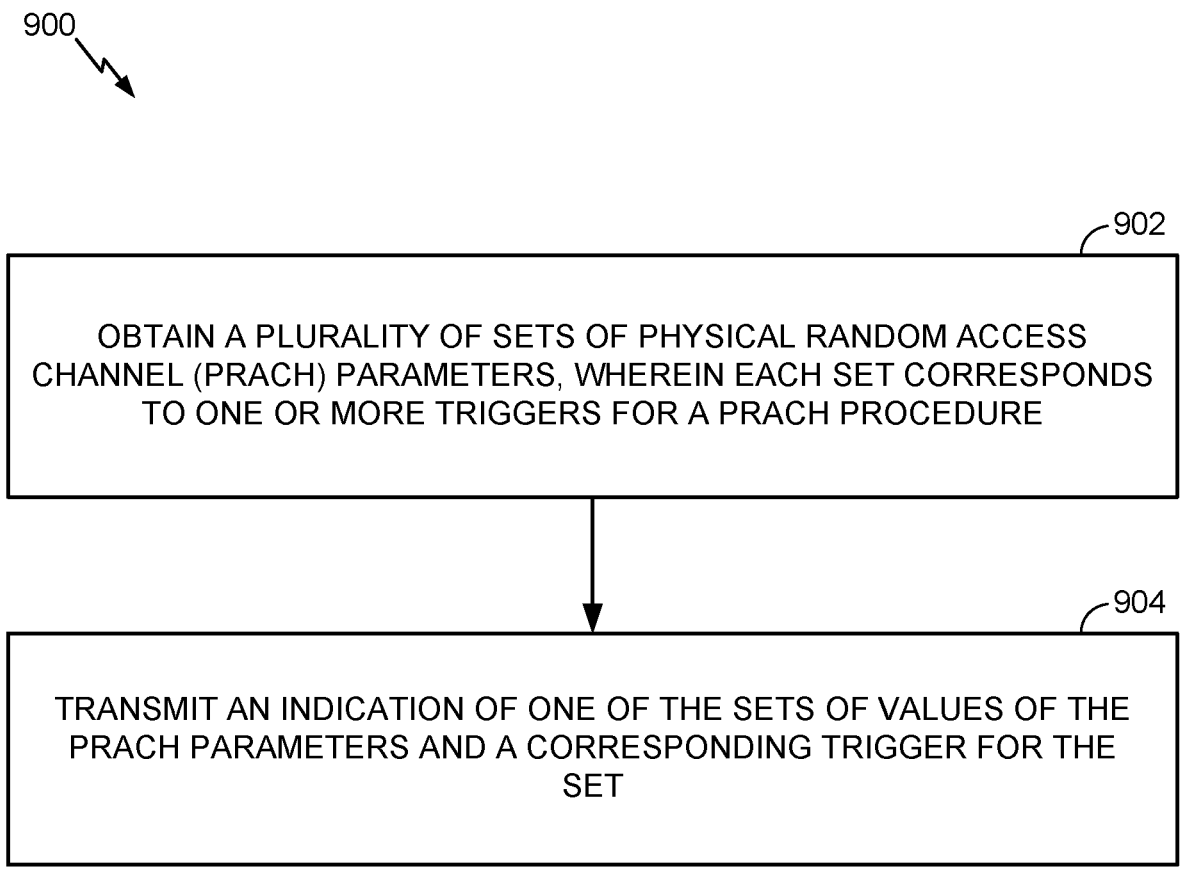
FIG. 9 illustrates exemplary operations for wireless communications that may be performed by a BS, in accordance with certain aspects of the present disclosure.

FIG. 9 illustrates example operation 900 for wireless communications that may be performed by a BS (e.g., eNodeB 110a in FIG. 1), according to aspects of the present disclosure. The operation 900 may be performed by a BS to provide parameters to a UE for the UE to use in differentiating a PRACH procedure from other PRACH procedures (e.g., by other UEs or by the UE at another time), for example. The operation 900 may be considered complementary to the operation 800 in FIG. 8 described above.

Operation 900 begins at block 902 with the BS obtaining a plurality of sets of physical random access channel (PRACH) parameters, wherein each set corresponds to one or more triggers for a PRACH procedure. For example, eNodeB 110a obtains (e.g., from a configuration file for the eNodeB) a plurality of sets of PRACH parameters (e.g., a first set for higher-priority PRACH procedures and a second set for lower-priority PRACH procedures), wherein each set corresponds to one or more triggers for a PRACH procedure.

Operation 900 continues at block 904, wherein the BS transmits an indication of one of the sets of values of the PRACH parameters and a corresponding trigger for the set. Continuing the example from above, the eNodeB transmits a SIB indicating one of the sets of PRACH parameters (e.g., the first set for higher-priority PRACH procedures) and a corresponding trigger (e.g., RRC connection re-establishment should be performed) for the set.

According to aspects of the present disclosure, the following parameters used in the baseline random access procedure can be configured differently for different services/slices/events to achieve differentiation: parameters for preamble transmission, which include an initial received power value (e.g., preambleInitialReceivedTargetPower), a power ramping step value (e.g., powerRampingStep), a Backoff Parameter Value, and/or a backoff multiplier value.

In aspects of the present disclosure, if a service, slice, and/or event (e.g., a trigger) needs faster access to the network by the UE, the UE can use larger values of the initial received power value (e.g., preambleInitialReceivedTargetPower) and the power ramping step value (e.g., powerRampingStep) in a PRACH procedure than the UE and other UEs use in other PRACH procedures. Using the larger values may enable the UE to achieve a higher success probability for the PRACH procedure (e.g., a higher success probability for access requests). If an access request is considered to have a lower priority, then a UE may use a larger Backoff Parameter Value so that the PRACH procedure of the UE causes less access contention with PRACH procedures with higher priorities.

According to aspects of the present disclosure, if a service is expected to be deployed on many UEs, then the UEs may be configured with a small value of the power ramping step value (e.g., powerRampingStep), in order to avoid creating excessive interference or contention. In addition, a large Backoff Parameter Value may be used by PRACH procedures by the UE, in order to reduce their access load on the network.

In aspects of the present disclosure, if a service and/or slice is sensitive to power consumption, then an improved combination of the initial received power value (e.g., preambleInitialReceivedTargetPower) and the power ramping step value (e.g., powerRampingStep) may be configured to minimize a total amount of energy consumed by a UE performing a network access. This improved combination may be a trade-off between power and access latency. For example, a lower initial received power value may be used to reduce power consumption. However, the initial received power value should not be too low, as a very low value may lower access success, possibly resulting in more retransmissions.

According to aspects of the present disclosure, when contention happens, the network can send back a Backoff Indicator in a Random Access Response (RAR) message to indicate to UEs how long the UEs should wait before performing attempting to access the network again (e.g., starting a new PRACH procedure). Although a same 4-bit Backoff Indicator may be sent to all UEs involved, this indicator can point to different tables of backoff values for different services, slices, and/or events, i.e., the same indicator can mean a shorter backoff duration for a request with a higher priority than for a request with a lower priority.

In aspects of the present disclosure, a UE may, after receiving a backoff indicator in a RAR message, determine a backoff period based on an initial Backoff Parameter value and a backoff multiplier. A UE may determine a backoff multiplier based on a priority (e.g., higher or lower) of a request and then determine a backoff period by multiplying the initial Backoff Parameter value by the determined backoff multiplier. A higher-priority access request may use a smaller backoff multiplier than a lower-priority access request.

In aspects of the present disclosure, to implement the differentiated random access procedure described above, a network may configure and/or specify a mapping (e.g., create and transmit a configuration to UEs) between triggers of random access requests and sets of random access parameters. Such triggers may include the priority of the logical channel that has data arrival, the type of random access events (e.g. re-synchronization), or an index to network slices.

According to aspects of the present disclosure, a network (e.g., a base station of a network) can provide multiple sets of access parameters in RACH related system information blocks (SIBs). In addition, the network can specify which set of parameters an access request should use, based on the trigger of the request.

According to aspects of the present disclosure, a network (e.g., a base station of a network) can provide one or more sets of access parameters to a UE via RRC signaling. The network may be enabled to be more flexible in differentiating connected UEs by supplying sets of access parameters to the UEs via RRC signaling.

In aspects of the present disclosure, the mapping between sets of access parameters and triggers can be specified as part of a data radio bearer (DRB) establishment or as part of a protocol data unit (PDU) session establishment. For example, during a DRB establishment procedure, a UE gets a set of random access parameters (as mentioned earlier) as part of a quality of service flow indicator (QFI).

According to aspects of the present disclosure, the priorities of different types of contention-based random access events are defined as follows:

According to aspects of the present disclosure, for initial access by a UE and access triggered by a UE needing to transmit new data in RRC Idle and inactive states (i.e., where access control applies), access priorities of a contention-based random access procedure by the UE are based on the access category of the new data that triggered the access procedure.

In aspects of the present disclosure, a mapping between access priorities and access categories as mentioned above may be advertised in system information and/or configured on a UE by the network via dedicated RRC signaling.

According to aspects of the present disclosure, for a UE that is RRC connected, for control plane events, handovers using contention-based access and RRC connection re-establishment may be assigned a higher access priority, while other control plane events may be assigned a lower access priority.

In aspects of the present disclosure, for a UE that is RRC connected, content-based random access events may be assigned low access priority (e.g., for access triggered by new data, as it is assumed SR will be configured for high access priority traffic).

According to aspects of the present disclosure, further configuration of access priority may be configured (e.g., at a UE) by the network via dedicated RRC signaling.

Example Configuration of Random Access Window for Prioritized Random Access

As mentioned above, a UE may perform a random access procedure to get connected to a network. This procedure includes at least the following steps:

1. UE transmits a randomly selected preamble sequence (e.g., Msg1) in a selected occasion in the time and frequency domains;
2. After the transmission of the preamble sequence, the UE starts a timer (known as a response window) and listens for a reply (known as a random-access response, RAR, or Msg2) from the network.
3. If the UE successfully receives a RAR before the response window of the UE expires (i.e., before the timer runs out), the UE proceeds to the second part of the random access procedure (e.g., transmitting Msg3 of the random access procedure). If the UE does not successfully receive the RAR before the response window expires, the UE retransmits the preamble.

During this random access procedure, because the network in general does not know which UE is transmitting the preamble, the network has to configure a RAR window of the same duration for all UEs. However, it may be desirable for access requests triggered by different types of UE or different types of events (e.g., urgent vs delay-insensitive data) to be treated with different priorities. For example, a network can configure response windows of different durations for different types of requests. Configuring response windows of different durations for different types of requests enables a UE transmitting higher priority access requests to determine more quickly (e.g., access requests with higher priority have a shorter response window) if the UE needs to retransmit, and hence may enable the UE to achieve a shorter overall latency in completing the random access procedure.

According to aspects of the present disclosure, access requests with different priorities may be configured (e.g., specified in system information by a BS or other network entity) to transmits preamble sequences in different PRACH occasions in time and/or frequency domains.

In aspects of the present disclosure, a network entity (e.g., a BS) may determine the priority of a received preamble sequence based on a set of time and/or frequency resources used in transmitting the preamble sequence. That is, a BS may receive a preamble sequence in a set of transmission resources and determine a priority of the received preamble sequence (and hence, the priority of the RACH procedure being performed by the UE that transmitted the preamble sequence) based on the set of transmission resources.

According to aspects of the present disclosure, access requests (i.e., random access requests as described herein) with different priorities may be configured (e.g., specified in system information by a BS or other network entity) to use response windows of different durations.

In aspects of the present disclosure, a network entity (e.g., a BS) may give higher priority in detecting and processing preambles transmitted in transmission resources for higher-priority PRACH transmissions and send back a RAR to a UE transmitting a higher-priority PRACH before the response window of the higher-priority PRACH expires.

Figure 10A:
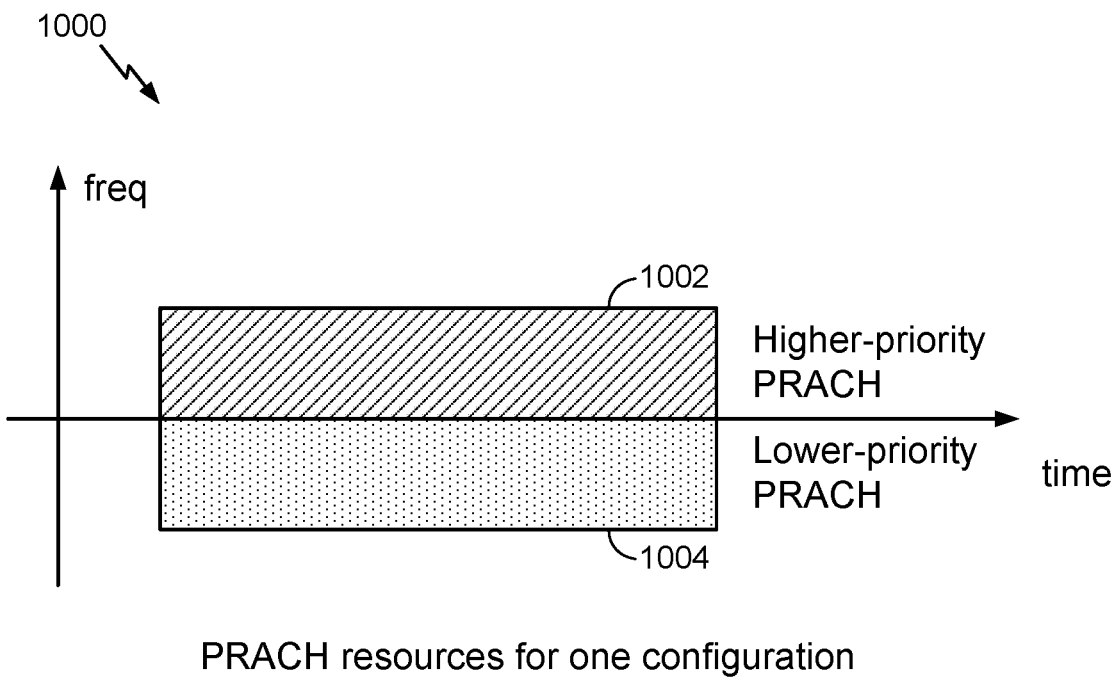
FIGS. 10A & B schematically illustrate sets of resources reserved for PRACH signals, in accordance with certain aspects of the present disclosure.

FIG. 10A is a schematic illustration of a set of transmission resources 1000 reserved (e.g., by a BS for use in a cell served by the BS) for PRACH signals (e.g., a PRACH region), in accordance with aspects of the present disclosure. The frequency region 1002 is a set of tones to be used by a UE transmitting a higher-priority PRACH. For example, a UE may select resources from frequency region 1002 when transmitting Msg1 of a RACH procedure so that the UE can transmit an ultra-reliable low latency communication (URLLC) transmission. The frequency region 1004 is a set of tones to be used by a UE transmitting a lower-priority PRACH. A cell may select resources reserved for PRACH signals from a wider system bandwidth, and the cell may transmit indications of the resources reserved for PRACH signals in one or more SIBs and/or via RRC signaling.

Figure 10B:
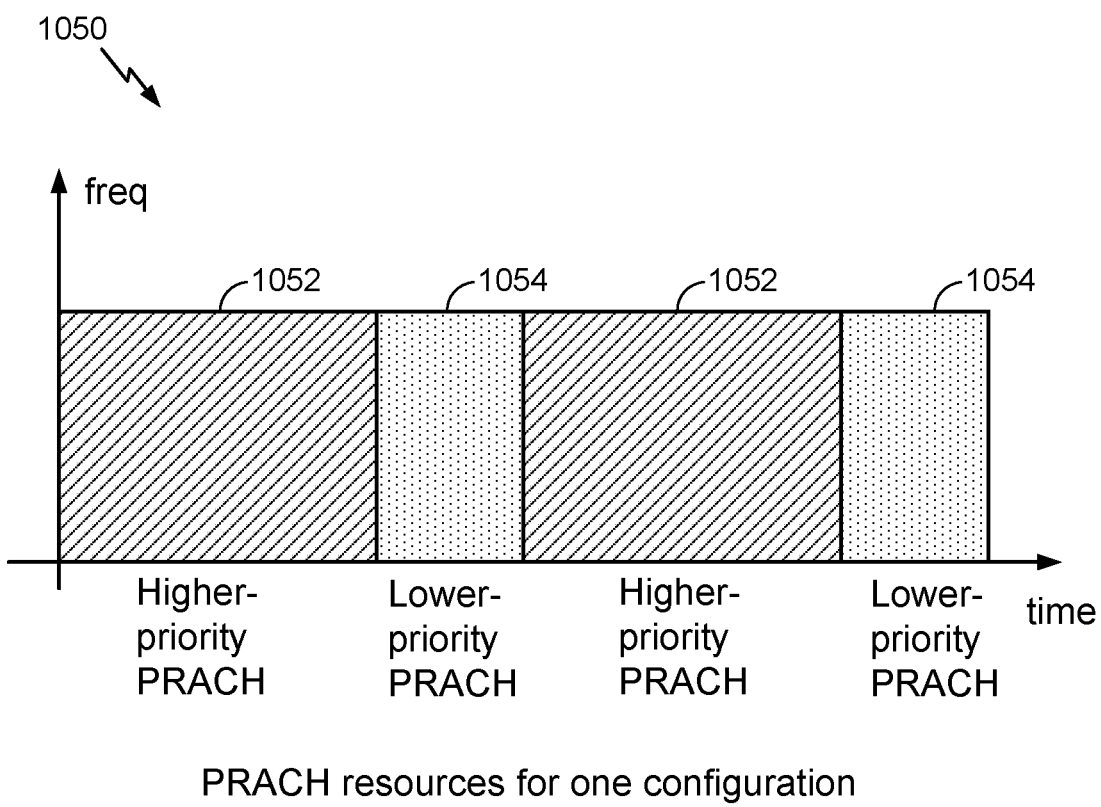

FIG. 10B is a schematic illustration of a set of transmission resources 1050 reserved (e.g., by a BS, by a cell) for PRACH signals (e.g., a PRACH region), in accordance with aspects of the present disclosure. The time region 1052 is a period to be used by a UE transmitting a higher-priority PRACH. For example, a UE may select resources from time region 1052 when transmitting Msg1 of a RACH procedure so that the UE can transmit an ultra-reliable low latency communication (URLLC) transmission. The time region 1004 is a period to be used by a UE transmitting a lower-priority PRACH. A cell may select resources reserved for PRACH signals from a wider system bandwidth, and the cell may transmit indications of the resources reserved for PRACH signals in one or more SIBs and/or via RRC signaling.

While FIG. 10A shows a division of PRACH resources in the frequency domain and FIG. 10B shows a division of PRACH resources in the time domain, the present disclosure is not so limited. PRACH resources may be divided in a combination of time and frequency division. In addition, other methods of dividing PRACH resources (e.g., code division) may be used to indicate priority of a RACH procedure.

Figure 11:
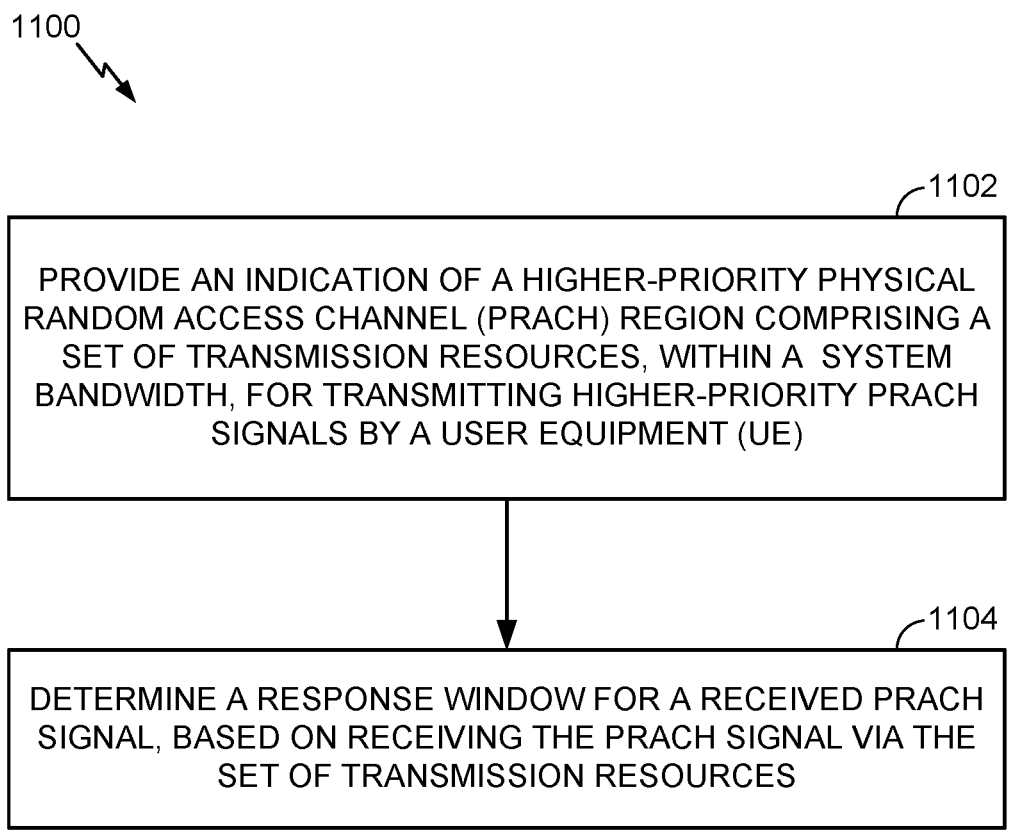
FIG. 11 illustrates exemplary operations for wireless communications that may be performed by a BS, in accordance with certain aspects of the present disclosure.

FIG. 11 illustrates example operation 1100 for wireless communications that may be performed by a BS (e.g., eNodeB 110a in FIG. 1), according to aspects of the present disclosure.

Operation 1100 begins at block 1102, wherein the BS provides an indication of a higher-priority physical random access channel (PRACH) region comprising a set of transmission resources, within a system bandwidth, for transmitting higher-priority PRACH signals by a user equipment (UE). For example, eNodeB 110a provides an indication of a higher-priority physical random access channel (PRACH) region comprising a set of transmission resources, within a system bandwidth, for transmitting higher-priority PRACH signals by UE 120a. The indication may be, for example, a list of frequency resources to use for transmitting higher-priority PRACH signals that the eNodeB transmits in a SIB.

Operation 1100 continues at block 1104, wherein the BS determines a response window for a received PRACH signal, based on receiving the PRACH signal via the set of transmission resources. Continuing the example from above, the eNodeB determines a response window for a received PRACH signal (e.g., a preamble sequence), based on receiving the PRACH via the set of frequency resources that the eNodeB indicated in block 1102.

Figure 12:
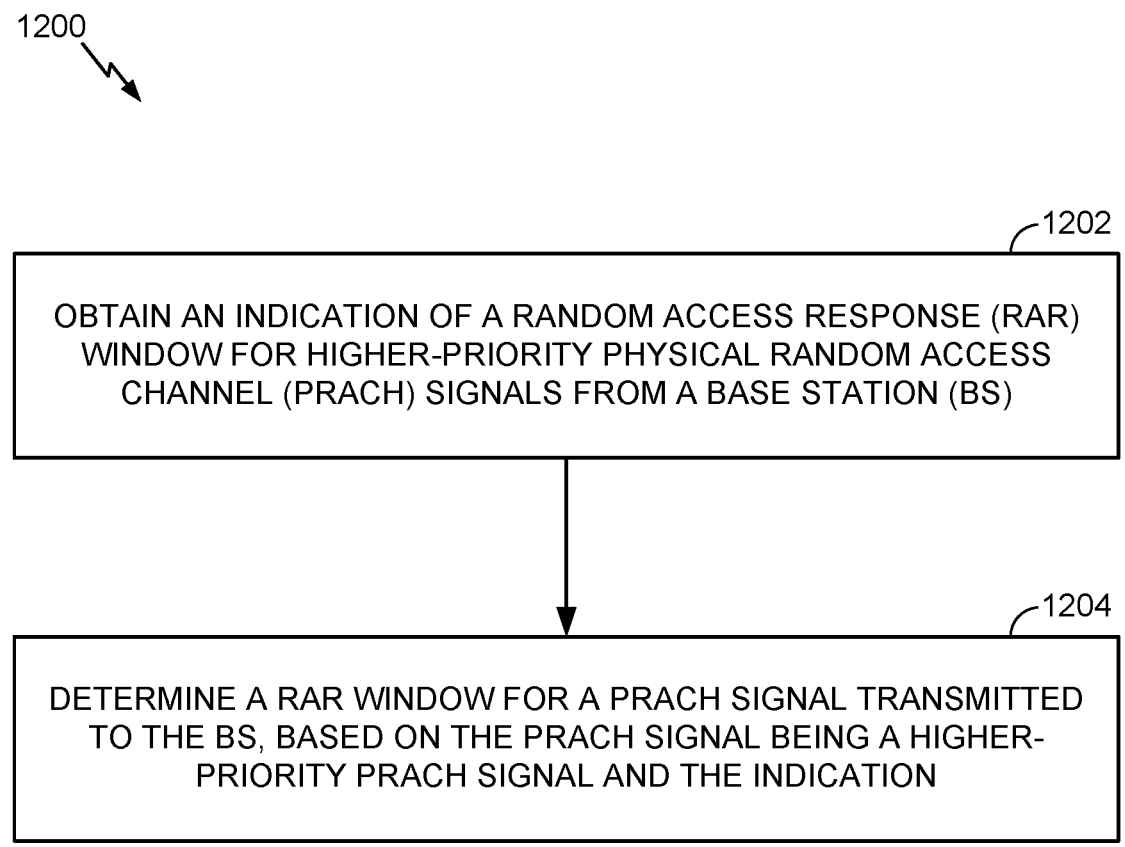
FIG. 12 illustrates exemplary operations for wireless communications that may be performed by a UE, in accordance with certain aspects of the present disclosure.

FIG. 12 illustrates example operation 1200 for wireless communications that may be performed by a UE (e.g., UE 120a in FIG. 1), according to aspects of the present disclosure. The operation 1200 may be considered complementary to the operation 1100 in FIG. 11 described above.

Operation 1200 begins at block 1202, wherein the UE obtains an indication of a random access response (RAR) window for higher-priority physical random access channel (PRACH) signals from a base station (BS). For example, UE 120a may obtain an indication of a RAR window for higher-priority PRACH signals from a SIB transmitted by eNodeB 110a.

At block 1204, the UE determines a RAR window for a PRACH signal transmitted to the BS, based on the PRACH signal being a higher-priority PRACH signal and the indication. Continuing the example from above, UE 120a determines a RAR window for a PRACH signal transmitted (e.g., a random access preamble transmitted by the UE) to eNodeB 110a, based on the PRACH signal being a higher-priority PRACH signal and the indication (e.g., a SIB) obtained by the UE at block 1202.

The steps of a method or algorithm described in connection with the disclosure herein may be embodied directly in hardware, in a software module executed by a processor or processing system, or combinations thereof A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor, processing system, and/or the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering. For example, means for determining, means for performing, means for transmitting, means for receiving, means for sending, means for applying, means for providing, means for selecting, means for using, means for updating, means for obtaining, means for scheduling, means for evaluating, and/or means for measuring may include one or more processors or other elements, such as the transmit processor 264, the controller/processor 280, the receive processor 258, and/or antenna(s) 252 of the user equipment 120 illustrated in FIG. 2, and/or the transmit processor 220, the receive processor 238, the controller/processor 240, and/or antenna(s) 234 of the base station 110 illustrated in FIG. 2.

In one or more exemplary designs, the functions described may be implemented in hardware, software or combinations thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A user equipment (UE) for wireless communication, comprising:
    a memory; and
    at least one processor coupled to the memory, wherein the at least one processor is configured to:
        receive a plurality of sets of physical random access channel (PRACH) parameter values, wherein the plurality of sets of PRACH parameter values includes a first set of PRACH parameter values associated with a beam failure recovery event and a second set of PRACH parameter values associated with a handover event, wherein the first set of PRACH parameter values comprises a backoff multiplier value; and
        perform, based on the beam failure recovery event, a PRACH procedure using the first set of PRACH parameter values associated with the beam failure recovery event, wherein, to perform the PRACH procedure, the at least one processor is configured to:
            transmit a first random access preamble;
            receive a random access response (RAR) comprising a backoff indicator value in response to the first random access preamble;
            determine a period by multiplication of the backoff indicator value with the backoff multiplier value;
            wait for the period; and
            transmit a second random access preamble subsequent to waiting for the period.

2. The UE of claim 1, wherein the first set of PRACH parameter values comprises one or more of an initial received power value or a power ramping step value.

3. The UE of claim 1, wherein, to receive the plurality of sets of PRACH parameter values, the at least one processor is configured to:
    receive the plurality of sets of PRACH parameter values in a system information block (SIB).

4. The UE of claim 3, wherein the at least one processor is configured to:
    receive an indication that at least one of a data radio bearer (DRB), a quality of service flow indicator (QFI), or a network slice is associated with the first set of PRACH parameter values.

5. The UE of claim 3, wherein the at least one processor is configured to:
    receive an indication that the first set of PRACH parameter values is associated with a set of data radio bearers (DRBs), quality of service flow indicators (QFIs), or network slices.

6. The UE of claim 1, wherein, to receive the plurality of sets of PRACH parameter values, the at least one processor is configured to:
    receive the plurality of sets of PRACH parameter values during a data radio bearer (DRB) establishment procedure.

7. The UE of claim 1, wherein the plurality of sets of PRACH parameter values is included in a quality of service flow indicator (QFI).

8. The UE of claim 1, wherein, to receive the plurality of sets of PRACH parameter values, the at least one processor is configured to:
    receive the plurality of sets of PRACH parameters from a base station (BS), wherein each set of the sets of PRACH parameters is associated with at least one of a quality of service flow indicator (QFI), a network slice, a protocol data unit (PDU) session, or a data radio bearer (DRB).

9. The UE of claim 1, wherein, to receive the plurality of sets of PRACH parameter values, the at least one processor is configured to:
    receive the plurality of sets of PRACH parameter values via radio resource control (RRC) dedicated signaling.

10. The UE of claim 9, wherein the at least one processor is configured to:
    receive an indication that at least one of a data radio bearer (DRB), a quality of service flow indicator (QFI), or a network slice is associated with the first set of PRACH parameter values.

11. The UE of claim 9, wherein the at least one processor is configured to:
    receive an indication that first the set of PRACH parameter values is associated with a set of data radio bearers (DRBs), quality of service flow indicators (QFIs), or network slices.

12. The UE of claim 1, wherein the first set of PRACH parameter values comprises an initial received power value.

13. The UE of claim 1, wherein the first set of PRACH parameter values comprises a power ramping step value.

14. A method of wireless communication performed by a user equipment, the method comprising:
    receiving a plurality of sets of physical random access channel (PRACH) parameter values, wherein the plurality of sets of PRACH parameter values includes a first set of PRACH parameter values associated with a beam failure recovery event and a second set of PRACH parameter values associated with a handover event, wherein the first set of PRACH parameter values comprises a backoff multiplier value; and performing, based on the beam failure recovery event, a PRACH procedure using the first set of PRACH parameter values associated with the beam failure recovery event, wherein performing the PRACH procedure comprises:
transmitting a first random access preamble;
receiving a random access response (RAR) comprising a backoff indicator value in response to the first random access preamble;
determining a period by multiplying the backoff indicator value by the backoff multiplier value;
waiting for the period; and
transmitting a second random access preamble subsequent to waiting for the period.

15. The method of claim 14, wherein the plurality of sets of PRACH parameter values is included in a quality of service flow indicator (QFI).

* * * * *